L. Miller.
Mower.
No 765
Reissued July 19 1858
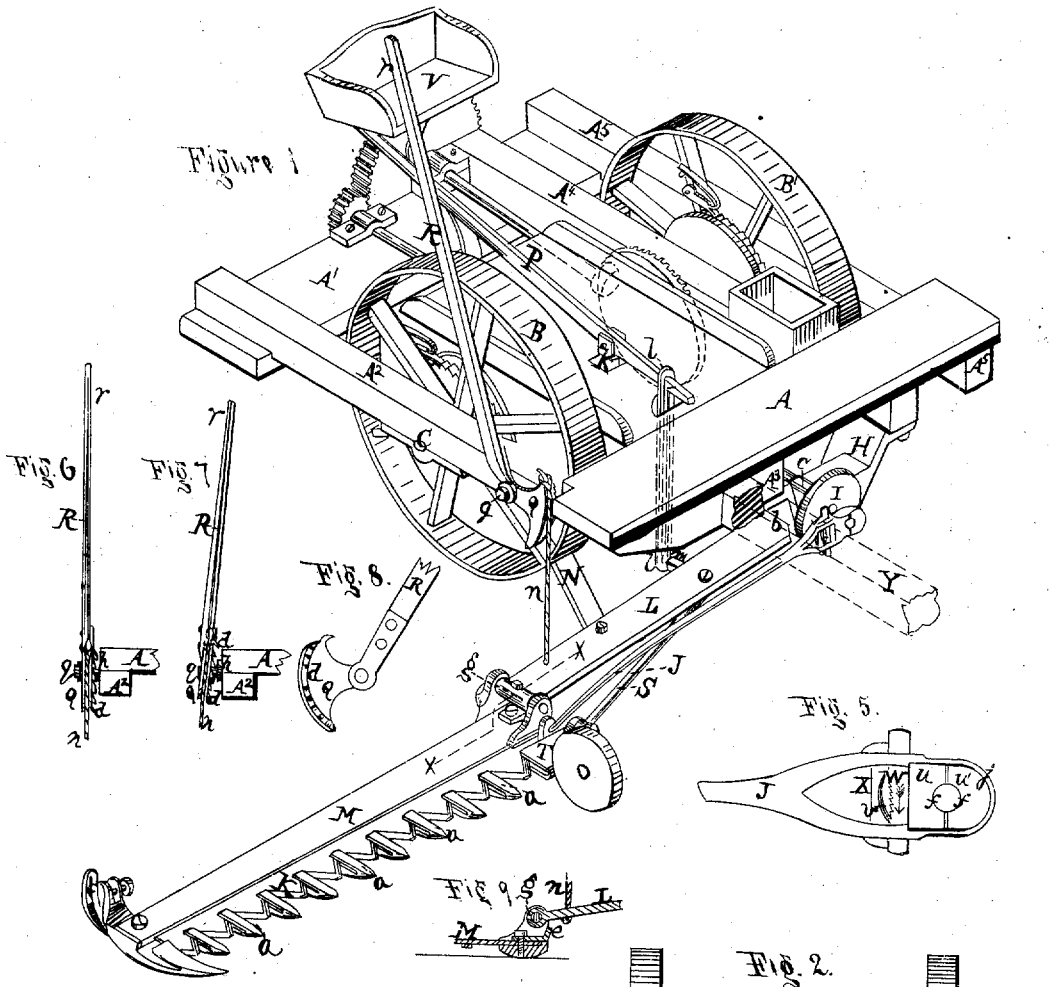
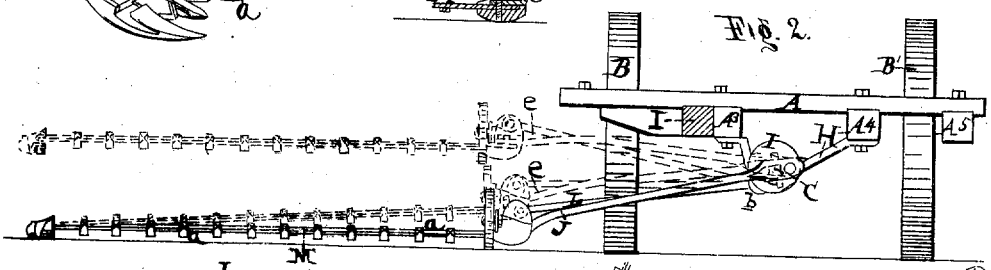
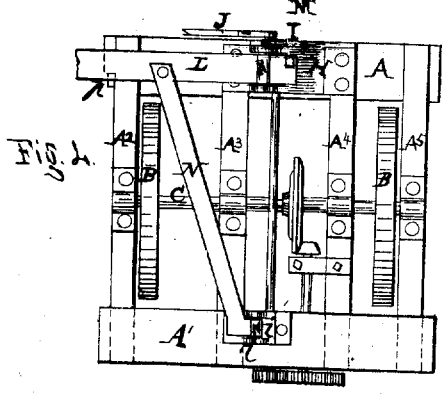
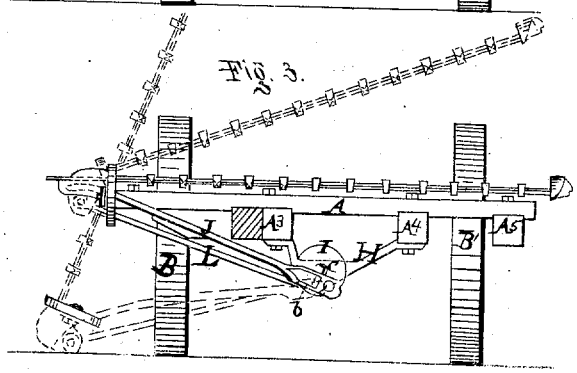

UNITED STATES PATENT OFFICE.

LEWIS MILLER, OF CANTON, OHIO, ASSIGNOR TO C. AULTMAN & CO.

IMPROVEMENT IN HARVESTERS.

Specification forming part of Letters Patent No. 20,180, dated May 4, 1858; Reissue No. 765, dated July 19, 1859.

DIVISION B.

*To all whom it may concern:*

Be it known that I, LEWIS MILLER, of Canton, in the county of Stark and State of Ohio, have invented certain new and useful Improvements in Machines for Harvesting Grain and Grass, of which the following is a full, clear, and exact description, reference being had to the accompanying drawings, which make part of this specification, and in which—

Figure 1 represents a view in perspective of the machine as arranged for mowing. Fig. 2 represents a front elevation of the machine, the black lines showing the finger-beam resting upon the ground in the position it will occupy when the machine is mowing on a level surface, the red lines showing the position of the finger-beam when mowing on an uneven surface, with its left end raised to conform thereto, and the blue lines showing the finger-beam raised off and held parallel to the ground by means of a hand-lever to pass over an obstacle. Fig. 3 represents by the black lines a front elevation of the machine, with the finger-beam folded over upon the frame in a compact manner. The red lines show the finger-beam raised on end preparatory to being lifted by the hand-lever and turned over upon the frame, and the blue lines show the finger-beam almost raised up and turned over upon the frame. Fig. 4 represents a view of the under side of the main frame and certain parts connected therewith, but showing more particularly the arrangement of the brace for supporting the coupling-arm. Fig. 5 represents, on an enlarged scale, a view of one side of a portion of the connecting-rod which transmits motion from the crank to the cutter. Fig. 6 represents a front view of the quadrant-lever for lifting, and the ratchet-teeth and detent for holding up the finger-beam when raised; also a fragment of the adjacent part of the frame detached from the machine. Fig. 7 represents a similar view of the same parts, the quadrant-lever and its ratchet-teeth being in the position they occupy when turned aside to disengage the teeth from the detent preparatory to raising or lowering the finger-beam. Fig. 8 represents a view of the side of the quadrant having the ratchet-teeth thereon; and Fig. 9 represents a vertical section at the line *x x* of Fig. 1, showing the knuckle of the joint connecting the finger-beam and coupling-arm.

That side of the machine on which the finger-beam projects when on the ground in the position shown in Fig. 1 I call the "right" side. The other I call the "left" side.

In a mowing-machine in which the finger-beam is connected to the main frame by a hinged connection having so large a range of motion as to allow the finger-beam to be raised from the ground and folded over upon the frame it is highly important that the connection of the finger-beam with the frame should be very strong and rigid in the direction opposed to the draft. To attain this object when using a main frame so narrow that the cutter projects wholly on one side of it, a wider basis is required for bracing it than has heretofore been contrived in such a frame, and the means for the attainment of this object is the subject of the invention herein claimed, which consists in hinging the coupling-arm to the main frame, on one side of the main axle C, and supporting it against the force of the draft by means of a brace hinged on the opposite side of the axle, whereby the basis of the bracing may be equal to the entire length of the main frame, thereby bringing the direction of the thrust so nearly into line with the brace as to enable the latter to sustain the coupling-arm with great firmness, and enabling it to carry the finger-beam with corresponding firmness. By this arrangement the strains are more equally distributed throughout the frame, rendering the whole machine more rigid, and thereby diminishing the liability of the gearing to bind in its teeth and in its bearings, and correspondingly diminishing its friction and liability to break.

In the accompanying drawings the main frame A $A'$ $A^2$ $A^3$ $A^4$ $A^5$ of the machine is supported by an axle, C, and a pair of wheels, B and $B'$. A tongue, Y, projects from the front of the frame for the horses to draw the machine by.

The finger-beam M, which supports the guard-fingers *a* and cutter K, is connected by a coupling-arm, L, to the main frame, the arm being hinged at its right end to the left end of the finger-beam, and at its left end to a bracket, H, that projects from the under side of the front portion of the frame. This coupling-arm is supported by a brace, N, firmly secured to it at its front end, and at its rear end hinged to a bracket, *i*, projecting from the under side of the rear portion of the main frame, the axis of the hinge *i'* of the brace being in line with the axis of the hinge of the left end of the coupling-arm, which allows the coupling-arm and the brace to turn freely up and down together, and maintains them in the same relative position to each other whether they be raised or lowered at their free extremities. The hinges of the coupling-arm and of the brace and the point at which the brace and arm are united are so disposed as to allow the brace and arm to be raised and lowered, as shown in the drawings, without coming into contact with the main wheels or their axle.

As the remaining portions of the machine do not relate to the subject-matter of the claim under this patent, it is not deemed necessary to describe them more particularly here.

What I claim under this patent as my invention is—

Hinging the coupling-arm to the frame at one side of the main axle and supporting it by a brace hinged to the frame on the opposite side of the axle in such manner as to obtain, among other things, a wide basis for bracing on a short frame, without interfering with the folding up of the finger-beam against or upon the frame, to render the machine more portable, substantially as described.

In testimony whereof I have hereunto subscribed my name.

LEWIS MILLER.

Witnesses:
S. H. WALKER,
JAS. S. TOWNER.